(12) United States Patent
Higuchi et al.

(10) Patent No.: US 8,657,332 B2
(45) Date of Patent: Feb. 25, 2014

(54) AIR BELT APPARATUS

(75) Inventors: Tatsuya Higuchi, Tokyo (JP); Atsushi Ichida, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/640,462

(22) PCT Filed: Apr. 4, 2011

(86) PCT No.: PCT/JP2011/058521
§ 371 (c)(1), (2), (4) Date: Oct. 10, 2012

(87) PCT Pub. No.: WO2011/129214
PCT Pub. Date: Oct. 20, 2011

(65) Prior Publication Data
US 2013/0249200 A1    Sep. 26, 2013

(30) Foreign Application Priority Data
Apr. 12, 2010    (JP) .................................. 2010-091277

(51) Int. Cl.
*B60R 21/18*    (2006.01)

(52) U.S. Cl.
USPC ...................................... 280/733; 280/743.1

(58) Field of Classification Search
USPC .................. 280/733, 743.1, 801.1, 805, 808; 297/464, 468, 483
See application file for complete search history.

(56) References Cited

U.S. PATENT DOCUMENTS

| | | | | |
|---|---|---|---|---|
| 5,478,113 A | * | 12/1995 | Rogers | 280/743.1 |
| 5,570,900 A | * | 11/1996 | Brown | 280/729 |
| 6,082,763 A | * | 7/2000 | Kokeguchi | 280/733 |
| 6,276,715 B1 | * | 8/2001 | Takeuchi | 280/733 |
| 2002/0074784 A1 | * | 6/2002 | Mishima et al. | 280/733 |
| 2006/0237954 A1 | * | 10/2006 | Kokeguchi | 280/733 |

(Continued)

FOREIGN PATENT DOCUMENTS

| | | |
|---|---|---|
| EP | 1 326 767 B1 | 12/2005 |
| EP | 1 710 134 A2 | 10/2006 |

(Continued)

OTHER PUBLICATIONS

English translation of the International Preliminary Report on Patentability (Chapter I or Chapter II of the Patent Cooperation Treaty) from the International Bureau of WIPO for International Application No. PCT/JP2011/058521 dated Nov. 15, 2012 (6 pages).

(Continued)

*Primary Examiner* — Ruth Ilan
*Assistant Examiner* — Robert A Coker
(74) *Attorney, Agent, or Firm* — Fitch, Even, Tabin & Flannery, LLP

(57) ABSTRACT

An air belt apparatus is provided in which a bag is stored while being folded short prior to deployment and inflation. An air belt apparatus includes a bag provided in a part of a seatbelt, a collision detection device, and a gas supply device that supplies deployment gas to the bag. The bag includes a cylindrical portion connected to the gas supply device, and an inflatable portion wider than the cylindrical portion. Prior to deployment and inflation, the inflatable portion is stored on a radial inner side of the cylindrical portion while being turned inside out and folded up to a width substantially equal to a width of the cylindrical portion.

5 Claims, 6 Drawing Sheets

(56) References Cited

U.S. PATENT DOCUMENTS

| | | | |
|---|---|---|---|
| 2007/0029767 A1* | 2/2007 | Kokeguchi | 280/733 |
| 2007/0069509 A1 | 3/2007 | Kokeguchi et al. | |
| 2007/0080528 A1* | 4/2007 | Itoga et al. | 280/733 |
| 2009/0033077 A1 | 2/2009 | Yamataki | |

FOREIGN PATENT DOCUMENTS

| | | |
|---|---|---|
| EP | 1 767 410 A2 | 3/2007 |
| EP | 2 020 343 A2 | 2/2009 |
| GB | 2 390 339 A | 1/2004 |
| JP | 2000-203380 A | 7/2000 |
| JP | 2002-187514 A | 7/2002 |
| JP | 2004-511391 A | 4/2004 |
| JP | 2006-001548 A | 1/2006 |
| JP | 2006-282164 A | 10/2006 |
| JP | 2007-083996 A | 4/2007 |
| JP | 2007-126052 A | 5/2007 |
| JP | 2009-035176 A | 2/2009 |
| JP | 2011-105064 A | 6/2011 |
| WO | 02/32727 A1 | 4/2002 |
| WO | 2008/026369 A1 | 3/2008 |

OTHER PUBLICATIONS

International Search Report for International Application No. PCT/JP2011/058521 dated Jul. 5, 2011 (2 pages) and an English translation of the same (2 pages).

Extended European Search Report and European Search Opinion issued in counterpart European Application No. 11 768 735.0, dated Jul. 23, 2013 (6 pages).

* cited by examiner

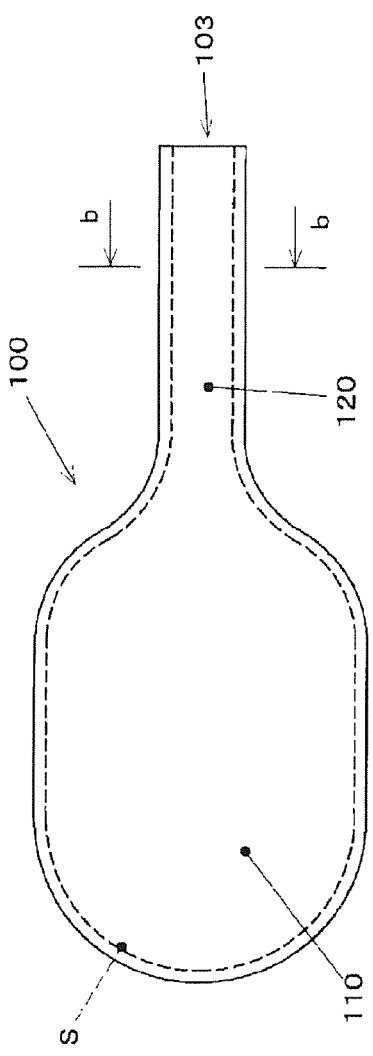
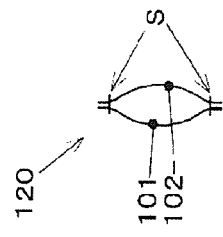
Fig. 2(a)
Fig. 2(b)
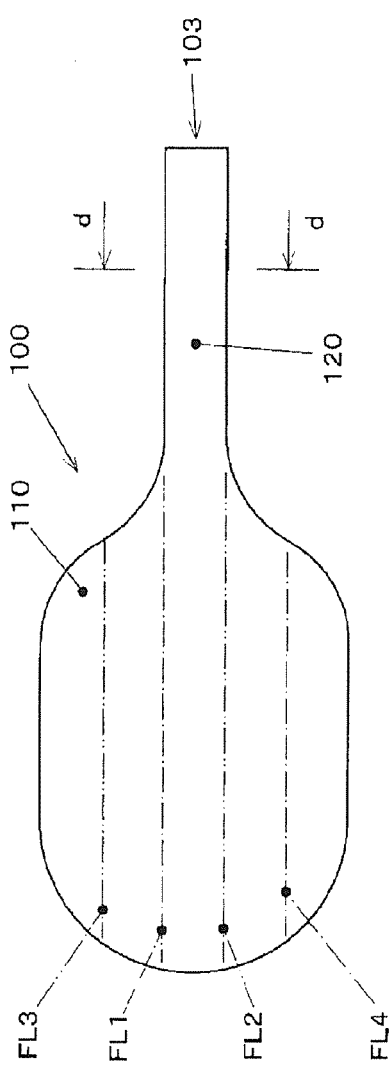
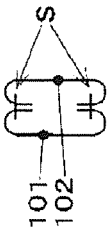
Fig. 2(c)
Fig. 2(d)

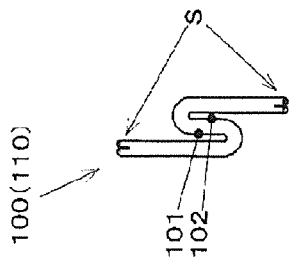
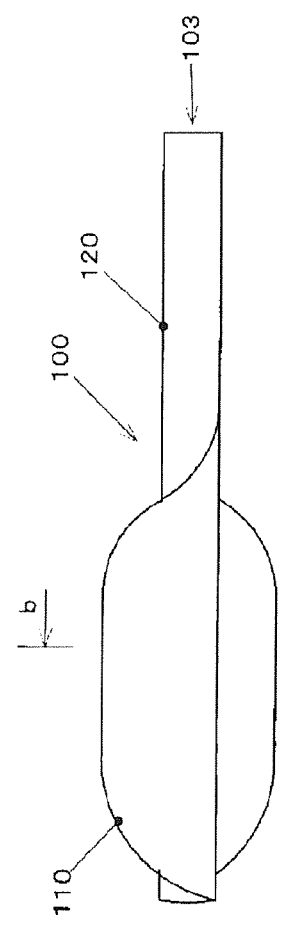
Fig. 3(a)
Fig. 3(b)
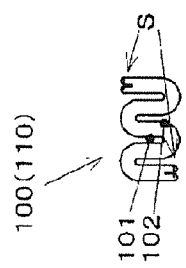
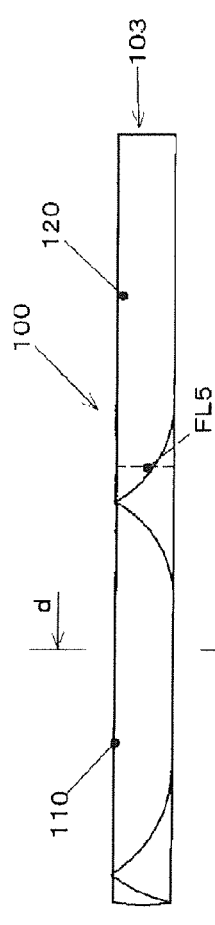
Fig. 3(c)
Fig. 3(d)
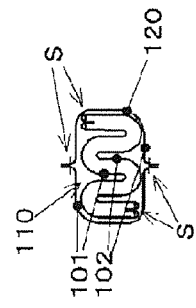
Fig. 3(e)
Fig. 3(f)

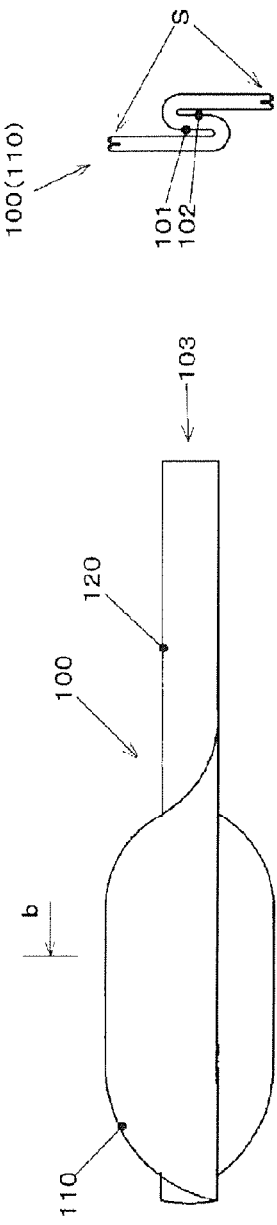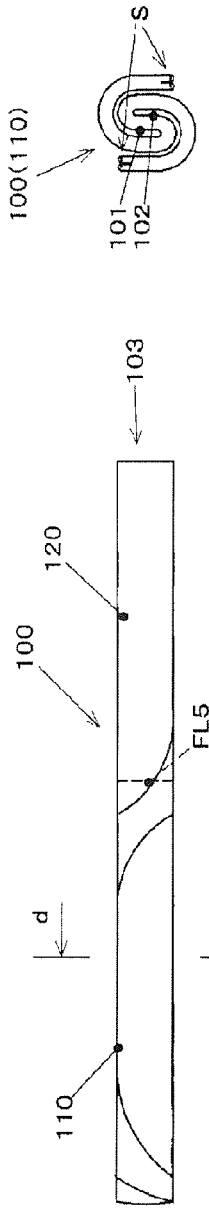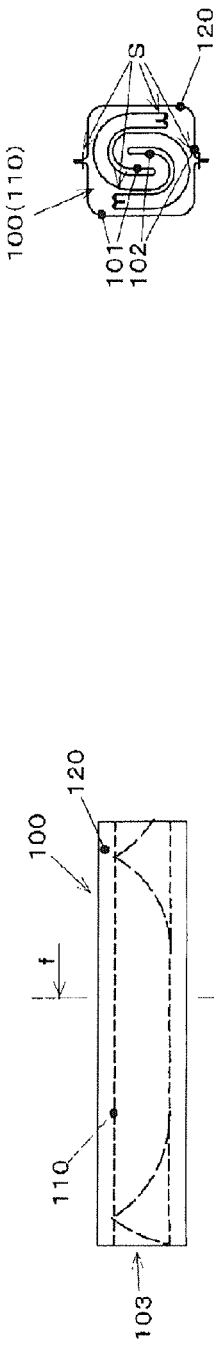

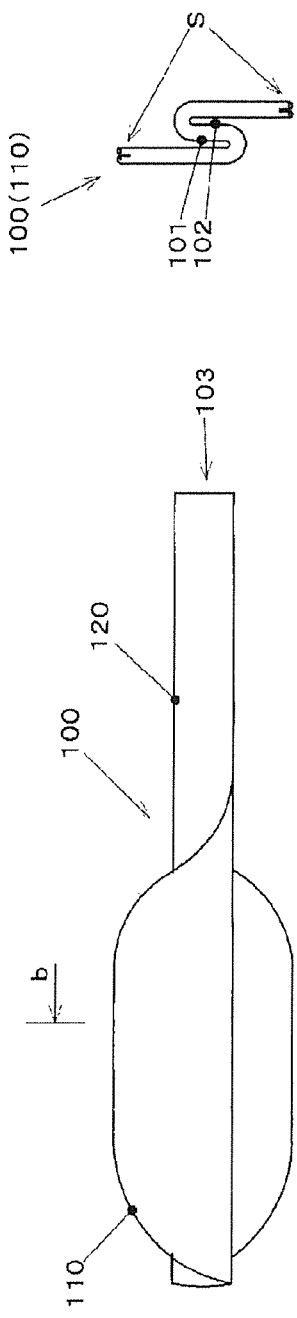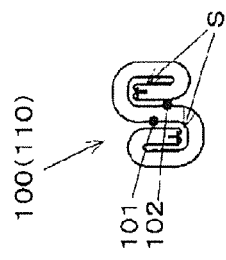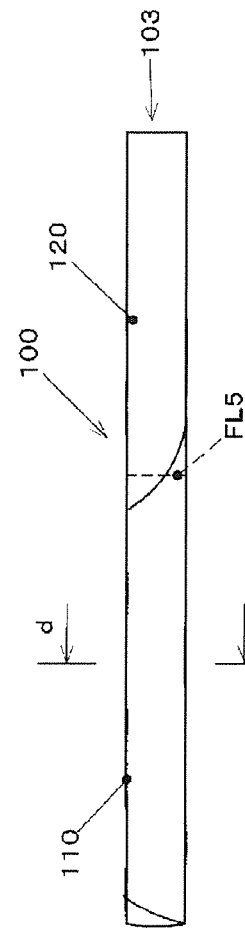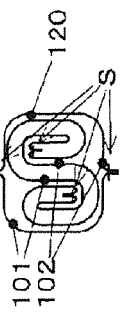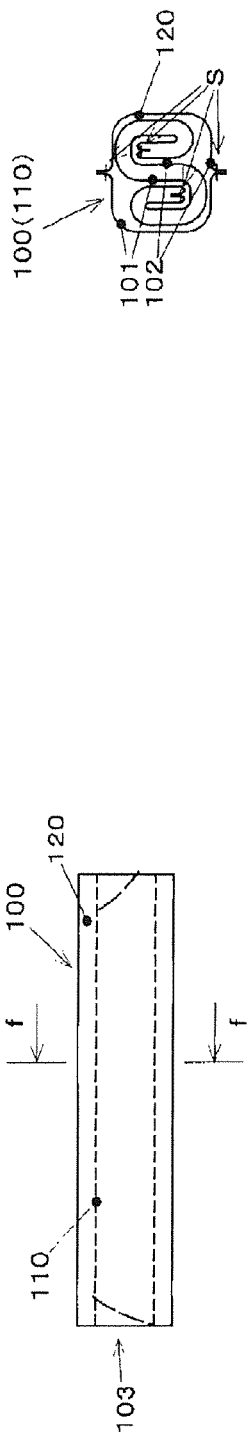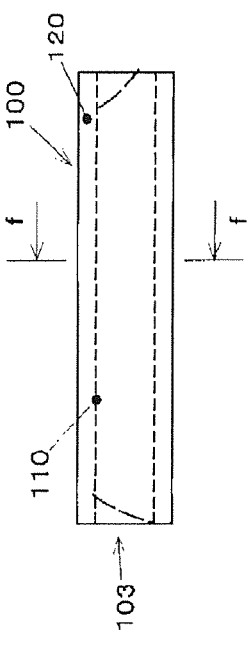

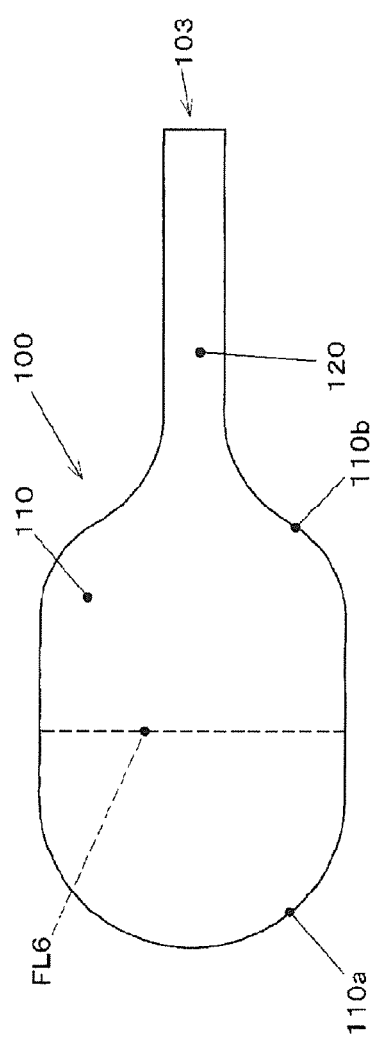
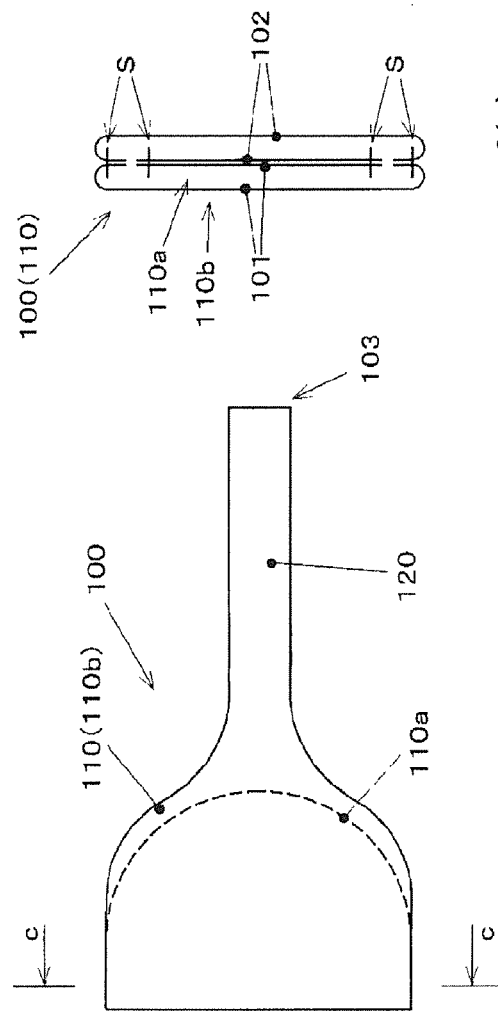
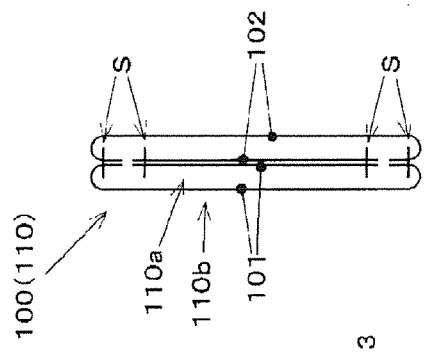
Fig. 6(a)
Fig. 6(b)
Fig. 6(c)

AIR BELT APPARATUS

CROSS-REFERENCE TO A RELATED APPLICATIONS

This application is a U.S. national phase application filed under 35 U.S.C. §371 of International Application PCT/JP2011/058521, filed on Apr. 4, 2011, designating the United States, which claims priority from Japanese Application 2010-091277, filed on Apr. 12, 2010, which are hereby incorporated herein by reference in their entirety.

FIELD OF THE INVENTION

The present invention relates to an air belt apparatus in which a deployable and inflatable bag is provided in a part of a seatbelt and in which the bag is folded short prior to deployment and inflation.

BACKGROUND OF THE INVENTION

For example, in vehicles such as automobiles, air bag apparatuses are widely used to restrain an occupant by a bag that is deployed and inflated by deployment gas injected when a collision or a sign of the collision is detected.

In recent years, as one type of such an air bag apparatus, there has been proposed an air belt apparatus in which a bag is provided in a part of a seatbelt for higher occupant restraint performance.

For example, Japanese Unexamined Patent Application Publication No. 2006-282164 describes an air belt apparatus in which a bag is provided in a shoulder belt for restraining an occupant from the shoulder to the breast and an inflator is provided at a buckle attached to a side of a surface of a seat in a three-point seatbelt for an automobile.

During a non-use state such as a normal use state of the vehicle (a state prior to deployment and inflation), the bag is stored in a folded state in mesh webbing or the like. However, a portion that stores the bag is thicker and less bendable than the other portions of the webbing of the shoulder belt. Hence, it is difficult for that portion to pass through an anchor where the shoulder belt is folded back.

For this reason, the bag is required to be stored while being folded short in a longitudinal direction of the seatbelt so that the bag can be located closer to a tongue than the anchor even when the seatbelt is not used.

In contrast, in Japanese Unexamined Patent Application Publication No. 2006-282164, as illustrated in FIG. 8 thereof, the bag is folded short by folding a portion of the bag remote from the inflator inward.

SUMMARY OF INVENTION

However, in the above-described folding method of the related art, of an inflatable portion and a cylindrical portion for introducing deployment gas into the inflatable portion in the bag, the length of only the inflatable portion is reduced by almost half. In this case, the effect of entirely shortening the bag is insufficient.

In view of the above-described problem, an object of the present invention is to provide an air belt apparatus in which a bag is stored while being folded short prior to deployment and inflation.

To solve the above-described problem, an air belt apparatus according to the present invention includes: a seatbelt that restrains an occupant sitting in a seat; a bag provided in a part of the seatbelt to be deployed and inflated by pressure of deployment gas; a collision detection device that detects a collision or a sign of the collision; and a gas supply device that supplies the deployment gas to the bag on the basis of a detection result of the collision detection device. The bag includes a cylindrical portion connected to the gas supply device, and an inflatable portion provided on a side of the cylindrical portion remote from the gas supply device, the inflatable portion being wider than the cylindrical portion. Prior to deployment and inflation, the inflatable portion is stored on a radial inner side of the cylindrical portion while being turned inside out and folded up to a width substantially equal to a width of the cylindrical portion.

According to this, since the inflatable portion is stored on the radial inner side of the cylindrical portion while being turned inside out and folded up, the total length of the bag in a folded state can be made less than, for example, the related art in which only the inflatable portion is folded inward. For this reason, the portion storing the bag is easily prevented from passing through an anchor when the air belt apparatus is not worn.

In the present invention, the bag can be folded by folding the inflatable portion along a folding line extending in a longitudinal direction of the seatbelt in a state in which the bag is entirely turned inside out, and then folding back the cylindrical portion onto the folded inflatable portion.

By thus folding the inflatable portion while the bag is entirely turned inside out and folding back the cylindrical portion onto the inflatable portion, the above-described air belt apparatus can be provided easily.

In the present invention, the bag can be folded up by folding a portion of the inflatable portion remote from the cylindrical portion to an inner side of a portion close to the cylindrical portion in a state in which the bag is entirely turned inside out, folding the inflatable portion along a folding line extending in a longitudinal direction of the seatbelt, and then folding back the cylindrical portion onto the folded inflatable portion.

According to this, the bag can be folded shorter by folding back the portion of the inflatable portion remote from the cylindrical portion to the inner side of the portion close to the cylindrical portion.

In the present invention, the inflatable portion of the bag can be folded in an accordion form by being sequentially folded in opposite directions along a plurality of folding lines extending in parallel.

Further, in the present invention, the inflatable portion of the bag can be folded in a roll form by being sequentially folded in the same direction along a plurality of folding lines extending in parallel.

According to these, the inflatable portion of the bag can be folded narrow, and the inflatable portion can be reliably deployed when the deployment gas is introduced. This can provide high occupant restraint performance.

As described above, according to the present invention, it is possible to provide an air belt apparatus in which a bag is stored while being folded short prior to deployment and inflation.

BRIEF DESCRIPTION OF THE DRAWINGS

FIGS. 2(a)-2(d) includes first views illustrating a bag folding procedure in the first embodiment.

FIGS. 3(a)-3(f) includes second views illustrating the bag folding procedure in the first embodiment.

FIGS. 4(a)-4(f) includes views illustrating a bag folding procedure in a second embodiment of an air belt apparatus to which the present invention is applied.

FIGS. 5(a)-5(f) includes views illustrating a bag folding procedure in a third embodiment of an air belt apparatus to which the present invention is applied.

FIGS. 6(a)-6(c) includes views illustrating a bag folding procedure in a fourth embodiment of an air belt apparatus to which the present invention is applied.

DETAILED DESCRIPTION OF THE PREFERRED EMBODIMENTS

Figure 1:
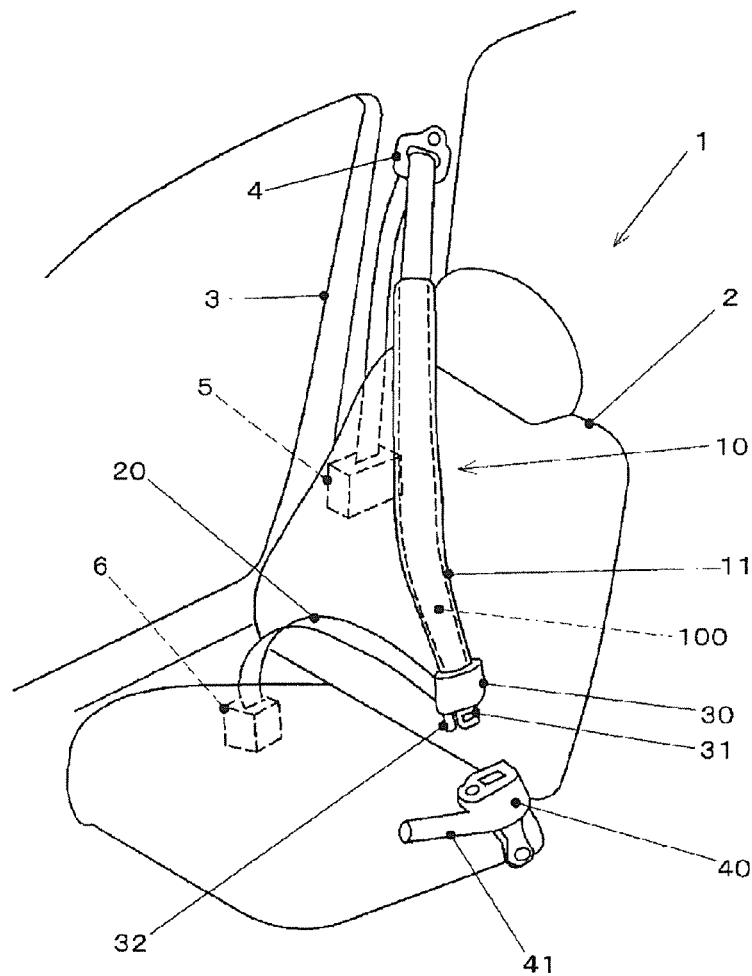
FIG. 1 is schematic perspective view of a first embodiment of an air belt apparatus to which the present invention is applied.

First to fourth embodiments of an air belt apparatus to which the present invention is applied will be described below.

An air belt apparatus according to a first embodiment is formed, for example, as a three-point seatbelt for a front seat in an automobile such as a car.

An air belt apparatus 1 restrains an unillustrated occupant sitting in a seat 2.

The air belt apparatus 1 includes a shoulder belt 10, a lap belt 20, a tongue 30, a buckle 40, etc.

The shoulder belt 10 is a portion obliquely placed from a shoulder of the occupant on one of the right and left sides to a hip on the other side during use. An upper end portion of the shoulder belt 10 is folded back downward at an anchor 4 mounted on a pillar 3, and is retracted by a retractor 5 provided in a lower part of the pillar 3 during non-use.

The anchor 4 is a through anchor through which the shoulder belt 10 can pass.

In an area between a middle portion of the shoulder belt 10 and the tongue 30, a bag storage portion 11 is provided.

The bag storage portion 11 stores a bag 100 (see FIGS. 2 and 3) in a folded state. The bag 100 deploys and inflates when a vehicle collision or a sign of the collision (pre-crash) is detected by an unillustrated collision detection device. The bag 100 is inserted in a folded state in an unillustrated sleeve of mesh webbing. On an outer side of the mesh webbing, a cover is provided to form an outer surface of the bag storage portion 11.

The mesh webbing is a woven fabric obtained by weaving yarn into mesh, and has a property of being able to stretch in one direction (for example, a width direction of the shoulder belt 10) but being substantially unable to stretch in the other direction (for example, a longitudinal direction of the shoulder belt 10).

The lap belt 20 is a portion that is placed in a vehicle width direction during use to restrain the occupant's hip. An end of the lap belt 20 on an inner side in the vehicle width direction (a side remote from the pillar 3) is connected to a lower end of the shoulder belt 10 at the tongue 30. The other end of the lap belt 20 is connected to a retractor 6 provided at a lower end of the pillar 3, and is retracted during non-use.

The tongue 30 is a member that connects the shoulder belt 10 and the lap belt 20. The tongue 30 is provided with a tongue plate 31 formed by a metal member removably attached to the buckle 40.

The buckle 40 is a metal member to which the tongue plate 31 of the tongue 30 is removably attached, and is fixed to a side portion of the seat 2 or the floor of the vehicle with a stay being disposed therebetween.

The buckle 40 is provided with an inflator 41 that supplies deployment gas to the bag 100.

On the other hand, the tongue 30 is provided with a gas supply pipe 32 that introduces the deployment gas generated by the inflator 41 into the bag 100.

Next, the bag 100 and a folding procedure therefor will be described.

FIG. 2(a) is a schematic plan view of the bag 100 developed before being folded.

FIG. 2(b) is a schematic sectional view on arrow b-b of FIG. 2(a).

As illustrated in FIG. 2(b), the bag 100 is formed by superposing and sewing a pair of base cloth panels 101 and 102 along outer peripheral edges, excluding an injection opening 103, with stitches S. Unillustrated sealing agent is applied to the sewn portion to prevent leakage of deployment gas.

In the bag 100, an inflatable portion 110 for restraining the occupant upon deployment and inflation and a cylindrical portion 120 for supplying deployment gas from the gas supply pipe 32 to the inflatable portion 110 are provided integrally.

For example, the inflatable portion 110 is shaped like an ellipse having a long axis direction almost along the longitudinal direction of the shoulder belt 10 (a horizontal direction in FIG. 2).

The cylindrical portion 120 extends in a belt form in the longitudinal direction of the shoulder belt 10 from one end of the inflatable portion 110. At an end of the cylindrical portion 120 remote from the inflatable portion 110, an injection opening 103 is provided.

The inflatable portion 110 is wider in the width direction of the shoulder belt 10 (an up-down direction in FIG. 2) than the cylindrical portion 120.

Next, a description will be given of a folding procedure for the bag 100.

First, the bag 100 is entirely turned inside out.

FIG. 2(c) is a schematic plan view of the bag 100 turned inside out.

FIG. 2(d) is a schematic sectional view on arrow d-d of FIG. 2(c).

The bag 100 turned inside out is sequentially folded along folding lines FL1 to FL4 illustrated in FIG. 2(c).

The folding lines FL1 and FL2 are located on extensions of both sides of the cylindrical portion 120 turned inside out.

The folding lines FL3 and FL4 are located in parallel on outer sides of the folding lines FL1 and FL2.

In FIG. 2, a mountain folding line that is convex to a front side of the plane of paper is shown by a one-dot chain line, and a valley folding line that is concave to the front side is shown by a two-dot chain line.

Here, the folding lines FL1 and FL4 are mountain folding lines, and the folding lines FL2 and FL3 are valley folding lines.

First, the bag 100 is sequentially folded along the folding lines FL1 and FL2.

FIG. 3(a) is a schematic plan view illustrating a state in which the bag 100 is folded along the folding lines FL1 and FL2.

FIG. 3(b) is a schematic sectional view on arrow b-b of FIG. 3(a).

Next, the bag 100 is sequentially folded along the folding lines FL3 and FL4. The inflatable portion 110 is thereby folded up to a width substantially equal to a width of the cylindrical portion 120.

FIG. 3(c) is a schematic plan view illustrating a state in which the bag 100 is folded along the folding lines FL3 and FL4.

FIG. 3(d) is a schematic sectional view on arrow d-d of FIG. 3(c).

After that, the bag 100 is folded back along a folding line FL5 so that a front surface portion of the cylindrical portion 120 during use is exposed. The folded inflatable portion 110 is received inside the cylindrical portion 120 folded back.

FIG. 3(e) is a schematic plan view of the bag 100 in a state in which the cylindrical portion 120 is folded back.

FIG. 3(f) is a schematic sectional view on arrow f-f of FIG. 3(e).

In this state, the gas supply pipe 31 is connected to the injection opening 103, and the bag 100 is inserted into the mesh webbing and the cover, and is received in the bag storage portion 11 of the shoulder belt 10.

According to the above-described first embodiment, the following advantages can be obtained.

(1) Since the inflatable portion 110 is received on a radial inner side of the cylindrical portion 120 while being turned inside out and folded up, the total length of the bag 100 in a folded state can be made shorter than, for example, the related art in which only the inflatable portion 110 is folded inward from the middle portion. For this reason, the air belt apparatus 1 can be easily structured such that the bag storage portion 11 does not pass through the anchor 3 when the air belt apparatus 1 is not worn.

(2) Since the inflatable portion 110 is folded in a state in which the bag 100 is entirely turned inside out and the cylindrical portion 120 is then folded back, the bag 100 can be easily folded short.

(3) Since the inflatable portion 110 is folded in an accordion form, it can be folded narrow and can be reliably deployed when deployment gas is introduced. This provides high occupant restraint performance.

Next, a description will be given of a second embodiment of an air belt apparatus to which the present invention is applied.

In embodiments described below, portions substantially common to the foregoing embodiment are denoted by the same reference numerals, and descriptions thereof are skipped. Differences will be mainly described.

In the second embodiment, a folding line FL3 is a mountain folding line, a folding line FL4 is a valley folding line, and an area of an inflatable portion 110 on an outer side of the folding line FL3 and an area on an outer side of the folding line FL4 are wound around the outermost periphery in a roll form such as to be exposed on both sides of the inflatable portion 110 folded up.

FIG. 4(a) is a schematic plan view illustrating a state in which folding is performed along folding lines FL1 and FL2.

FIG. 4(b) is a schematic sectional view on arrow b-b of FIG. 4(a).

In this state, there is no difference from the above-described first embodiment.

FIG. 4(c) is a schematic plan view illustrating a state in which folding is performed along the folding lines FL3 and FL4.

FIG. 4(d) is a schematic sectional view on arrow d-d of FIG. 4(c).

After that, in a bag 100, a cylindrical portion 120 is folded back similarly to the first embodiment, and an inflatable portion 110 folded up is received in the cylindrical portion 120 folded back.

FIG. 4(e) is a schematic plan view of the bag 100 in which the cylindrical portion 120 is folded back.

FIG. 4(f) is a schematic sectional view on arrow f-f of FIG. 4(e).

The above-described second embodiment can obtain advantages substantially similar to the advantages of the above-described first embodiment.

Next, a description will be given of a third embodiment of an air belt apparatus to which the present invention is applied.

In the third embodiment, a folding line FL3 is a mounting folding line, and a folding line FL4 is a valley folding line. An area of an inflatable portion 110 on an outer side of the folding line FL3 is inserted into a valley formed by a folding line FL1. Further, an area of the inflatable portion 110 on an outer side of the folding line FL4 is inserted into a valley formed by a folding line FL2.

FIG. 5(a) is a schematic plan view illustrating a state in which folding is performed along the folding lines FL1 and FL2.

FIG. 5(b) is a schematic sectional view on arrow b-b of FIG. 5(a).

FIG. 5(c) is a schematic plan view illustrating a state in which folding is performed along the folding lines FL3 and FL4.

FIG. 5(d) is a schematic sectional view on arrow d-d of FIG. 5(c).

After that, in a bag 100, a cylindrical portion 120 is folded back, similarly to the first embodiment, and the inflatable portion 110 folded up is received in the cylindrical portion 120 folded back.

FIG. 5(e) is a schematic plan view illustrating a state in which the cylindrical portion 120 is folded back.

FIG. 5(f) is a schematic sectional view on arrow f-f of FIG. 5(e).

The above-described third embodiment can obtain advantages substantially similar to the advantages of the above-described first embodiment.

Next, a description will be given of a fourth embodiment of an air belt apparatus to which the present invention is applied.

FIG. 6(a) is a schematic plan view of a bag 100 turned inside out, and illustrates a state similar to that of FIG. 2(c).

In the fourth embodiment, a half portion 110a of an inflatable portion 110 remote from a cylindrical portion 120 is folded along a folding line FL6 to be received in a half portion 110b close to the cylindrical portion 120.

FIG. 6(b) is a schematic plan view illustrating a state in which the half portion 110a is folded into the half portion 110b.

FIG. 6(c) is a schematic sectional view on arrow c-c of FIG. 6(b).

The inflatable portion 110 of a bag 100 is folded up from this state along unillustrated folding lines FL1 to FL4 substantially similar to those of the first to third embodiments, and is then received in the cylindrical portion 120 turned inside out.

According to the above-described fourth embodiment, in addition to advantages substantially similar to those of the above-described first to third embodiments, the length of the bag 100 in the folded state can be further reduced by folding back the half portion 110a of the inflatable portion 110 into the half portion 110b.

The present invention is not limited by the above-described embodiments, and the embodiments can be appropriately modified without departing from the technical scope of the invention. For example, there are the following modifications. These modifications are also included in the technical scope of the invention.

The structure of the bag is not limited to the above-described embodiments, and can be changed appropriately. For example, while the bag is formed by sewing the peripheral portions of the two superposed base cloth panels in the embodiments, alternatively, the bag may be formed by folding one base cloth panel or may be formed by three or more base cloth panels. Further alternatively, the number of base cloth panels may differ among the portions, as required.

Further, the method for joining the base cloth panels is not limited to sewing, and other methods, such as adhesion, may be used.

The folding procedure for the inflatable portion of the bag and the layout of folding lines are not limited to those adopted in the above-described embodiments, and may be changed appropriately.

While, for example, the bag is provided in the shoulder belt of the air belt apparatuses of the embodiments, the present invention is not limited thereto. For example, the present invention is also applicable to a so-called lap bag in which a bag is provided in a lap belt for restraining the occupant's hip.

The invention claimed is:

1. An air belt apparatus comprising:
    a seatbelt that restrains an occupant sitting in a seat;
    a bag provided in a part of the seatbelt to be deployed and inflated by pressure of deployment gas;
    a collision detection device that detects a collision or a sign of the collision; and
    a gas supply device that supplies the deployment gas to the bag on the basis of a detection result of the collision detection device,
    wherein the bag includes a cylindrical portion connected to the gas supply device, and an inflatable portion provided on a side of the cylindrical portion remote from the gas supply device, the inflatable portion being wider than the cylindrical portion, and, prior to deployment and inflation, the inflatable portion is stored on a radial inner side of the cylindrical portion while being turned inside out and folded up to a width substantially equal to a width of the cylindrical portion.

2. The air belt apparatus according to claim 1, wherein the bag is folded up by folding the inflatable portion along a folding line extending in a longitudinal direction of the seatbelt in a state in which the bag is entirely turned inside out, and then folding back the cylindrical portion onto the folded inflatable portion.

3. The air belt apparatus according to claim 1, wherein the bag is folded up by folding a portion of the inflatable portion remote from the cylindrical portion to an inner side of a portion close to the cylindrical portion in a state in which the bag is entirely turned inside out, folding the inflatable portion along a folding line extending in a longitudinal direction of the seatbelt, and then folding back the cylindrical portion onto the folded inflatable portion.

4. The air belt apparatus according to claim 1, wherein the inflatable portion of the bag is folded in an accordion form by being sequentially folded in opposite directions along a plurality of folding lines extending in parallel.

5. The air belt apparatus according to claim 1, wherein the inflatable portion of the bag is folded in a roll form by being sequentially folded in the same direction along a plurality of folding lines extending in parallel.

* * * * *